United States Patent

Huck

[15] 3,678,103

[45] July 18, 1972

[54] AROMATIC AMINE-MODIFIED RESOLE RESINS IN COMBINATION WITH AROMATIC POLYCARBOXYLIC COMPOUNDS

[72] Inventor: Rodney M. Huck, Longmeadow, Mass.

[73] Assignee: Monsanto Company, St. Louis, Mo.

[22] Filed: March 12, 1971

[21] Appl. No.: 123,883

[52] U.S. Cl. .................... 260/51.5, 117/123 D, 117/124 E, 117/126 AB, 117/126 GR, 117/132 BF, 117/138.8 N, 117/155 L, 117/161 L, 161/198, 161/259, 161/264, 260/31.4 R, 260/32.6 N, 260/32.8 N, 260/33.2 R, 260/33.4 R, 260/33.6 R

[51] Int. Cl. ..............................................................C08g 5/18

[58] Field of Search ...............................................260/51.5

[56] References Cited

UNITED STATES PATENTS

3,558,559  1/1971  LeBlanc..............................260/51.5

*Primary Examiner*—Howard E. Schain
*Attorney*—John W. Klooster, James C. Logomasini, Richard W. Sternberg and Neal E. Willis

[57] ABSTRACT

Thermosettable compositions of an amine-modified resole resin and an aromatic polycarboxylic compound. These compositions can be thermoset by heat with temperatures and times approaching those used for thermosetting ordinary resole resins along and the product thermoset articles display improved thermal stability.

11 Claims, No Drawings

AROMATIC AMINE-MODIFIED RESOLE RESINS IN COMBINATION WITH AROMATIC POLYCARBOXYLIC COMPOUNDS

BACKGROUND

The art has recently come to appreciate that thermosettable compositions of an aromatic amine-modified novolac resin and an aromatic polycarboxylic compound, when thermoset, display improved thermal stability; see the LeBlanc U.S. Patent 3,558,559. Aromatic amine-modified novolac resins characteristically by themselves tHermoset poorly and characteristically they require another agent to induce good thermosetting by heat alone.

Amine-modified resole resins, on the other hand, characteristically, do thermoset well by themselves without the need for a curing agent. However, such modified resole resins when thermoset display at best only the typical heat stability characteristics commonly associated with phenolic resins generally; that is, they display maximum continuous service temperatures on the order of about 250°–400° F. or less when molded (with or without post-curing).

In general, it appears that, as the amine content of a resole resin is increased, the ability of the resulting resin to thermoset by itself is decreased. On the other hand, as the amine content of a resole increases, the capacity of the product resin to react (crosslink) with a polycarboxylic compound increases (assuming the amine reactivity, that is, the quantity of primary and secondary amine groups present, correspondingly exists). Thus, in any given composition of amine-modified resole resin and aromatic polycarboxylic compound, one must compromise heat resistance of thermoset molded body with composition moldability.

Those skilled in the art will readily understand that such variables as the nitrogen content of a starting resin, the reactivity of the individual nitrogen groups, the extent of any residual phenolic reactivity, and the like all can effect the maximum continuous service temperatures of a thermoset product. In turn, such variables can be affected by such resin synthesis factors as catalyst, starting material, etc. and by such cross-linking reaction variables as rearrangements at high temperature, etc.

It has now been discovered that, when an amine-modified resole resin is composited with an aromatic polycarboxylic compound, and then the resulting composition is thermoset, the resulting thermoset body has a surprisingly higher maximum continuous service temperature compared to the amine-modified resole resin body cured by itself.

Furthermore, and unexpectedly, it has also now been discovered that compositions of amine-modified resole resin and aromatic polycarboxylic compound can be molded at temperatures much below those necessary to mold compositions of aromatic amine-modified novolac resin and aromatic polycarboxylic compound. Thus, while temperatures of from about 450° to 650° F. are needed to mold aromatic amine-modified novolac resin/aromatic polycarboxylic compound compositions, temperatures of only about 350° to 400° F. are needed to mold compositions of amine-modified resole resin and aromatic polycarboxylic compound, these latter temperatures being only a little higher than those conventionally now used to mold one-stage resole resins. This difference in reactivity apparently results from the circumstance that the phenolic portion of the resole resin is still capable of self-thermosetting even though the reactivity of functional amine groups with carboxyl groups inherently tends to proceed at a greater rate at higher temperatures than those temperatures where phenolic thermosetting reactivity occurs. As those skilled in the art will appreciate, resole self-thermosetting capability can be made to vary over a very wide range of amine-substitution. Hence, during a molding operation, the phenolic portion of the resole resin tends to cure, while during subsequent post-curing operation at higher temperatures, the amine-carboxyl reaction tends to proceed.

In addition, and also unexpectedly, it has now been discovered that compositions of amine-modified resole resin and aromatic polycarboxylic compound can be partially precured before use in a molding operation so as to produce thermosettable molding compositions which have controlled viscosity and flow characteristics, so that a product partially precured resin system of this type can be fabricated so as to have an optimum set of viscosity and flow characteristics for a given molding operation or for a given molding machine.

Also, and unexpectedly, it has now been discovered that compositions of amine-modified resole resin and aromatic polycarboxylic compound, even when molded at the lower temperatures above indicated, generally cure at significantly more rapid rates than compositions of aromatic amine-modified novolac resin and aromatic polycarboxylic compound. This circumstance not only reduces the total quantity of thermal energy needed to achieve substantially complete crosslinking (thermosetting) whereby maximum continuous service temperatures are achieved, but also improves the initial strength characteristics of a molded body during its initial molding to the point where volatiles evolution therefrom, as in a subsequent heat treating operation (where thermosetting is completed), is far less likely to damage such body, as through blistering, swelling, distortion or the like.

Because amine-modified resole resins can be prepared in the form of relatively low molecular weight resins which polymerize (and thermoset) on heating, one can prepare compositions of aromatic amine modified resole resins and aromatic polycarboxylic compounds in the form of solutions, varnishes, dispersions, emulsifiable solutions and suspensions, in a manner not unlike that now conventionally done with resole resins generally. The result is that such compositions can be used to impregnate and treat porous substrates, and thereby make such industrial products as high temperature fluid filters, high temperature laminates, etc., which is a result difficult to achieve with novolacs and amine-modified novolacs owing to the fact that the inherent high molecular weight of such materials substantially prevents or makes very difficult the preparation of liquid solutions or dispersions thereof on an industrial scale.

SUMMARY

The present invention relates to new and useful thermosettable phenolic resin compositions of matter, to partially thermoset compositions produced therefrom, the thermoset products made therefrom and to methods for making the same. These compositions comprise at least one amine modified resole resin and at least one aromatic polycarboxylic compound. Such an amine-modified resole resin is generally characterized by having:

1. a number average molecular weight of from about 150 to 800,
2. a combined aldehyde to aniline plus phenol ratio of from about 0.9 to 2.0, 3. a mol ratio of aromatic amine to phenol in the range of 75:25 to 10:90.

Similarly, such an aromatic polycarboxylic compound is characterized as being within the class of compounds having the general formula:

(1)

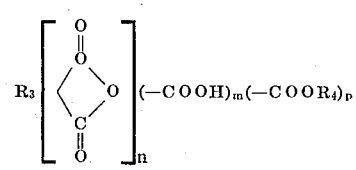

in which $R_3$ is an aromatic radical of three, four, five, or six valences and containing from six to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of n and p is always at least 1.

Preferably, $R_3$ contains a single six membered aromatic ring (i.e. phenyl) or a benzophenone nucleus, and $R_4$ is a lower alkyl radical. The term "lower" as used herein refers to a radical containing less than seven carbon atoms.

In general, the amine-modified resole resins as characterized above thermoset by heat alone; for example, when exposed to a temperature of about 380° F. without pressure.

For each 100 parts by weight of that amine-modified resole resin in a composition of this invention, one usually employs from about 5 to 200 parts by weight of aromatic polycarboxylic compound, though quantities of from about 15 to 90 are preferred.

DETAILS

For purposes of this invention, the term "thermoset" or "thermosetting"'d in reference to starting or product compositions of this invention indicates that a given thermosettable composition, after exposure to elevated temperatures for times sufficient to substantially completely react together substantially all of one of the two components (depending upon which one is present in excess of stoichiometric amount) with the other component comprising a composition of this invention so as to produce a product which is not only substantially insoluble, but also is substantially infusible. For purposes of this invention, the term "substantially insoluble" in relation to "thermoset" or "thermosetting" has reference to insolubility (or extractability) in common organic solvents, such as methyl ethyl ketone, so that not more than about 10 weight per cent of a given so thermoset product dissolves in such a solvent. Similarly, the term "substantially infusible" has reference to the fact that a given or thermoset product does not appreciably melt before decomposing when heated to elevated temperatures.

Typical aromatic amine beginning materials suitable for use in making the aromatic amine-aldehyde resins used in this invention are aromatic amines which have at least one primary amine group, or at least one secondary amine group substituted on an aromatic nucleus per molecule.

Typical beginning materials suitable for use in making amine-modified resole resins are:

A. a phenol which has at least one unsubstituted reactive position on the aromatic nucleus, B. an aromatic amine which has at least one primary amine group or at least one secondary amine group substituted on an aromatic nucleus, and C. an aldehyde containing at least one aldehyde group.

The phenols which can be employed in this invention are aromatic alcohols which have at least one hydroxyl group directly attached to the aromatic nucleus and which have at least one unsubstituted reactive position on the aromatic nucleus. It is normally the case that the reactive positions on the aromatic nucleus are those which are ortho and para to the hydroxyl group. Therefore, phenols which have at least one unsubstituted position ortho or para to the hydroxyl group are particularly useful.

Preferred phenols are phenol itself, alkylphenols, and aryl phenols wherein substituents on this phenol benzene ring have a total of from one to 18 carbon atoms, and most preferably, from one to six carbon atoms.

The aromatic starting amines which can be employed can be of many different types. Thus, it can be a class represented by the formula:

$$ArNH_2 \quad (2)$$

wherein Ar is an aryl group which has at least one unsubstituted reactive position on the aromatic nucleus. It can also be a class represented by the formula:

(3) 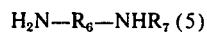

wherein Ar is as just defined and $R_5$ is an alkyl radical, an aryl radical, an aralkyl radical, an alkaryl radical, or the like. Preferably, in formulas (2) and (3), Ar is a phenyl radical and $R_5$ contains less than 11 carbon atoms.

Ordinarily in both formula (2) and formula (3) amines, the reactive positions are those which are ortho and para to the amino group. Accordingly, aromatic amines which have at least one unsubstituted position ortho or para to the amino group are preferred for use in preparing the condensation products employed in the invention. The presently most preferred aromatic amines are aniline, the alkyl-substituted anilines wherein the alkyl groups thereof have from one to four carbon atoms, and the alkyl-substituted diaminobenzenes wherein the alkyl groups thereof have from one to four carbon atoms.

The amines operative in the present invention can be aromatic diamines. Both aromatic primary and secondary diamines are operative in the present invention, but the aromatic primary diamines are preferred over the secondary because the secondary diamines are less desirable as the thermal stability and hydrolytic stability are apparently less than the primary diamines. The diamines are of the general formula:

$$H_2N-R_6-NH_2 \quad (4)$$

wherein $R_6$ is a divalent aromatic radical. Also operative are aromatic diamines having the general formula:

$$H_2N-R_6-NHR_7 \quad (5)$$

wherein $R_6$ is as above defined and $R_7$ is an alkyl radical, an aryl radical, an aralkyl radical, an alkaryl radical, or the like. Preferably, $R_6$ is a phenyl radical and $R_7$ is a lower alkyl radical.

The aldehydes which can be employed are alkanals such as formaldehyde, acetaldehyde, propionaldehyde and the like, aromatic aldehyde such as benzaldehyde, salicylaldehyde, and the like, haloalkanals, such as chloral, and the like. Formaldehyde is preferred. The formaldehyde can be employed in water solution or dispersion, or in an organic solvent such as methanol. It is preferred to employ the formaldehyde in aqueous solution (such as the 37 weight per cent aqueous solution known as formalin). Paraform can also be used.

Sometimes, if desired, the phenol and the aromatic amine can be combined into a single starting compound wherein the same aromatic nucleus has substituted thereon at least one hydroxyl group and at least one primary or secondary amine group. Similarly, if desired, the phenol and the aldehyde can be combined into a single starting compound wherein the same aromatic nucleus has substituted thereon at least one aldehyde group and at least one hydroxyl group. Similarly, if desired, the aromatic amine and the aldehyde can be combined into a single starting compound wherein the same aromatic nucleus has substituted thereon at least one aldehyde group and at least one primary or secondary amine group.

When such a composite polyfunctional starting material is employed, it is preferred to use such in admixture with an aromatic amine, a phenol, and an aldehyde. For example, one could employ up to about 50 weight per cent of such a polyfunctional starting material in making an amine modified resole.

When one makes an amine-modified resole resin using, for example, a phenol, an aromatic amine and an aldehyde, it is convenient and preferred to condense the starting materials under aqueous liquid phase conditions using heat and a base catalyst. Conventional and preferred base catalysts are organic and inorganic bases which are relatively strong as respects their disassociation constants. Examples of suitable such base catalysts include: calcium and barium hydroxides, ammonia, tertiary and quarternary organic amines (triethyl amine, and the like).

The amount of base catalyst employed can vary but, in general, is sufficient to produce a pH in an aqueous liquid phase medium of from about 7.0 to 9.5 (preferably from about 7.5 to 8.5) but this is not necessarily a critical factor.

The proportion of reactants employed is likewise not necessarily a critical factor, and can be varied over a wide range. For example, the mol ratio of aromatic amine groups to phenolic —OH groups ranges from about 75/25 to 10/90 and the mol ratio of aldehyde to the sum of aromatic amine groups plus phenolic —OH groups ranges from about 1.0 to 1.5. For instance, in a preferred specific embodiment, the charged mol ratio of aniline to phenol can range from about 50/50 to 20/80, though a more preferred range is from about 40/60 to 30/70. Similarly, and for example, the charged mole ratio of formaldehyde to the sum total of aniline and phenol is less than about 2.5.

For such a preferred condensation, the base catalyst is preferably triethylamine, ammonia or barium hydroxide in an amount of about 0.2 to 3 parts per 100 parts phenol (by weight). The temperature of reactants in such preferred embodiment can vary from about 60° to 100° C. Agitation of reactions during condensation is preferably continuous. The entire addition and condensation reactions may be carried out at reflux temperatures if desired. Since co-reactions are apparently involved, the reaction mechanism, it is theorized, may involve formation of low molecular weight intermediates which initially form, and then possibly rearrange and combine with one another at a later stage. Typically, addition and condensation reaction conditions are maintained until all aldehyde is consumed.

In general, conventional equipment can be employed for the reactions. For example, a reaction kettle equipped with agitator, means for reflux and distillation, nitrogen inlet means, and conventional heat transfer means is suitable. The material of construction can be steel, stainless steel, glass, Monel, or the like.

In general, a preferred method for carrying out the reaction of the phenol, aldehyde, and amine starting materials is to charge the phenol, aldehyde, and base catalyst and then add the aromatic amine. This mixture is brought to reflux at a temperature of from about 50° C. to about 100° C., and preferably from about 60° C. to about 80° C. using vacuum as required to control temperature. The reaction is continued for about 30 minutes to about 4 hours or until essentially all of the aldehyde is reacted At the end of the reaction period, the product can then be recovered by stripping off water and unreacted reagents under reduced pressure at temperatures from about 40° C. to about 100° C., and preferably, from about 60° to about 95° C.

Aniline phenol-formaldehyde resins prepared as just described generally have the above-described characteristics and constitute a preferred class of amine-modified phenolic resins suitable for use in the present invention.

In general, for use in the present invention, amine-modified resole resins are prepared in the form of substantially anhydrous starting materials, as explained above.

An advantage in dehydrating a starting amine-modified resole is that the dehydration procedure (using heat and reduced pressure as described above) typically also tends to remove impurities from a starting resin, such as unreacted starting materials, catalysts, etc.

Turning to the aromatic polycarboxylic compounds of formula (1), it will be appreciated that $R_4$, the monovalent hydrocarbon radical, is not a critical function in the present invention, and may be any monovalent alkyl, aryl, or even a cycloalkyl, halogenoalkyl, halogenoaryl or other halo-substituted radical (preferred chloro). The preferred monovalent hydrocarbon radicals are alkyl radicals, especially those containing from one through 10 carbon atoms. The aromatic carbonyl-containing compound must contain at least two carbonyl-containing groups in the ortho position. The anhydride groups, each with a valence of two, and each containing two carbonyl-containing groups, are always attached to adjacent carbon atoms on an aromatic ring. The formula (1) compounds can contain any combination of anhydride, acid, or ester groups, as defined in formula (1). A preferred number of carbonyl-containing groups per molecule is four, such as two anhydride groups, four acid groups, four ester groups or a combination of any four of these carbonyl-containing groups. A particularly preferred aromatic carbonyl containing compound is benzophenone tetracarboxylic acid dianhydride. The aromatic radicals must each contain at least two carbonyl-containing groups attached to adjacent carbon atoms whereas the other carbonyl-containing groups can be on any other ring position.

As a class, the compounds of formula (1) are known, as are methods for their preparation (so details concerning the latter are not given herein).

Preferably, for use in the present invention, aromatic polycarboxylic compounds are prepared in the form of substantially anhydrous starting materials, as explained above.

To make a thermosettable resinous composition of this invention, one takes an amine-modified resole resin as described above and an aromatic polycarboxylic compound as described above and simply mixes the two components together until a substantially uniform product mixture is obtained. The relative proportions of each are as broadly described above. The optimum proportions of amine-resole resin to aromatic polycarboxylic compound are determined in an individual situation by a number of variables such as the amine-content of the resole resin, the molecular weight and reactivity of the aromatic polycarboxylic compound, degree of thermal stability desired in a given thermoset product, processability parameters, molding equipment limitations, and the like. Hence, it is not possible to express precisely an optimum ratio of amine-modified resole resin.

In general, the proportion of aromatic polycarboxylic compound to amine-modified resole resin in any given thermosettable composition is based on the amount of aromatic amine in the resin used. Preferably the proportion of aromatic polycarboxylic compound to amine-modified resole resin is such that amide, imide, and/or ester linkages can be formed at each amine hydrogen and each phenolic hydroxyl site within each amine modified resole resin molecule. However, useful compositions are frequently achievable by using less than all such amine hydrogen and phenolic hydroxyl sites when cross-linking with an aromatic polycarboxylic compound such as taught in this invention. Also, utility is not appreciably affected, within wide limits, by using excesses of stoichiometric amounts of aromatic polycarboxylic compounds in relation to a given quantity of aniline-modified resole resin. During thermosetting, it should be noted that at higher temperatures, e.g. temperatures say above 200° C or more, typically, though not necessarily, rearrangements can occur in the thermoset material which result in a higher concentration of one form of linkage as opposed to another. For example, it is tentatively theorized (and there is no intent to be bound by theory herein) that at higher temperatures, rearrangement to form imide linkages is common in a given thermoset product of this invention.

In general, the thermosettable resinous compositions of this invention, owing to the initial substantially dehydrated character of each of the amine-modified resole resin and of the aromatic polycarboxylic compounds, respectively, employed in these compositions, are in the form of either powders which are characteristically free flowing, or liquids which are in the form of solutions or dispersions with the liquid medium thereof being organic and substantially anhydrous in character.

When making a solid, thermosettable composition of this invention, it is preferred to use an amine-modified resole resin and an aromatic polycarboxylic compound(as described above, respectively) in the form of solids which have particle sizes generally under about 50 mesh (U.S. Standard sieves). Preferably, particle sizes under about 100 mesh are used. The admixing of one component with the other can be made in a blender, such as a so-called Waring blender, a ball mill, or the like, although any convenient mechanical mixing means may be employed.

On the other hand, when preparing a liquid thermosettable composition of this invention, either or both the amine-modified resole or the aromatic polycarboxylic compound may initially be in a solid or liquid form. Thus, the amine-modified resole resin even in its substantially anhydrous form may be in a liquid condition. Although the aromatic polycarboxylic compound even in its dehydrated form may also be in a liquid condition, typically such aromatic polycarboxylic compound is in the form of a high melting solid.

As indicated, an organic liquid is used to dissolve or disperse either or both the amine-modified resole resin and the aromatic polycarboxylic compound. In general, the organic liquid used is one which is:

1. substantially inert (as respects each of the amine modified novolac resin and the aromatic polycarboxylic compound).
2. boils below about 250° C. (preferably 150° C.) at atmospheric,
3. is a mutual dispersant for both the amine modified novolac resin and the aromatic polycarboxylic compound, and
4. is substantially single phased.

By the term "mutual dispersant" as used herein reference is had to the fact that a given organic liquid is capable of acting either as a solvent and/or as a colloidal suspending medium for the amine modified resole resin and for the aromatic polycarboxylic compound in a product thermosettable composition of this invention. As used herein, the term "colloidal" is reference to a suspension or dispersion has reference to suspended or dispersed solid particles which are under about 200 millimicrons in average maximum individual particle size dimension.

By the term "substantially single phased" reference is had to the fact that a given organic liquid exists in a liquid composition of this invention as one phase.

While the organic liquid used has properties as indicated above. it will be appreciated that such a liquid in a particular composition of the invention can comprise mixtures of two or more chemically different organic liquids. For example, one can preliminarily dissolve or disperse the amine modified resole resin in one particular liquid, and the aromatic polycarboxylic compound in another particular organic liquid, and then thereafter mix the two resulting such organic liquids together. Obviously, when one uses such a mixture of different organic liquids, the liquids are so chosen as to be mutually intermiscible with one another at least in the respective amounts of the individual organic liquids employed in a given product mixture in order to obtain a compatible one phase liquid medium.

It is desirable and preferred to have a single phase organic liquid in liquid thermosettable compositions of this invention because of the possibility of having a concentration either of aromatic polycarboxylic compound or of amine modified resole resin which is greater in one liquid phase than in the other. Such a concentration differential could possibly lead to irregularities and non-uniformities in a thermoset composition derived therefrom, as those skilled in the art will appreciate.

Preferred organic liquids (especially when one is using) as the organic liquid a single chemical entity, are lower alkanones, such as acetone, methyl ethyl ketone or higher ketone. On the other hand, when one uses as the organic liquid a mixture of different organic entities, one can employ as preferred liquids lower alkanols (such as methanol or ethanol) or aliphatic, cycloaliphatic or aromatic hydrocarbons, including benzene, toluene, xylene, naphthalene, nonane, octane, petroleum fractions, etc. Conveniently, some of the organic liquid present can be excess alcohol left over from an esterification reaction involving an aromatic polycarboxylic compound. Any given organic liquid used in a composition of this invention is substantially anhydrous, as indicted above.

Preferably, the amine modified resole resin starting materials are substantially completely dissolved in the organic liquid phase of a liquid composition of this invention. If not so dissolved, the non-dissolved portion thereof is in the form of a colloidal dispersion or suspension of particles. Preferably, at least 80 percent of the amine modified resole resin is completely dissolved in the organic liquid and more preferably such resin is substantially completely dissolved in the organic liquid.

Similarly, the aromatic polycarboxylic compound starting materials are substantially completely dissolved in the organic liquid phase of a liquid composition of this invention. If not so dissolved, the non-dissolved portion thereof is in the form of a colloidal dispersion or suspension of particles. Preferably, at least 80 percent of the aromatic polycarboxylic compound is completely dissolved in the organic liquid and more preferably such resin is substantially completely dissolved in the organic liquid.

Those skilled in the art will appreciate that organic solvents can be added to a given liquid composition of this invention to improve the quantity of respective starting materials in true solution. For example, adding a ketone or an ester ether solvent, or even a so-called "super" solvent, such as dimethyl formamide, will generally improve the ability of a given composition to dissolve both classes of component starting materials. If dimethyl formamide is employed, it is preferred to use not more than about 20 weight percent of this material based on total organic liquid weight in a given liquid composition.

The respective concentrations of the amine modified resole resin and of the aromatic polycarboxylic compound in a given liquid composition of this invention relative to the total amount of organic liquid present can vary over extremely wide ranges. A rough but practical indication of the concentration of the respective starting materials in a given liquid composition is given by the viscosity of such a composition. A correlation between viscosity and particular contemplated end use cam sometimes be made, as those skilled in the art will readily appreciate. Characteristically, though not limitatively, a liquid composition of this invention can have viscosities ranging from about 10 to 5,000 centipoises. For impregnating applications, viscosities of from about 50–500 centipoises are usually preferred. The total solids content of a given liquid composition can be as high as about 75 weight percent or even higher, and as low as about 20 weight percent or even lower. Preferred solids contents usually fall in in the range of from about 50 to 70 weight percent as those skilled in the art will readily appreciate.

Liquid compositions of this invention can be advanced (e.g. crosslinked as by heating) to some extent without forming precipitates from the organic liquid. Advancing can be accomplished if desired by heating at temperatures generally in the range of from about 70° to 100° at atmospheric pressures for times typically in the range of from about 20 to 30 minutes or even longer, care being taken not to cause solid material to precipitate.

In both the solid and the liquid compositions of this invention, it will be appreciated that the ratio of amine modified resole resin to aromatic polycarboxylic compounds is as indicated above. However, mixtures of different amine modified resole resins and of different aromatic polycarboxylic compounds can be employed in any given composition to enhance characteristics desired for a particular end use application as those skilled in the art will readily appreciate.

Those skilled in the art will readily appreciate that various conventional additives can be composited with the solid or liquid compositions of this invention to promote effectiveness for particular end uses. For example, one can add dyes, colorants, release agents, fungicides, coupling agents, and the like.

In the case of the powdered products of this invention, one can add particular solid diluent materials to produce molding compositions. For example, a typical molding composition using a composition of this invention contains from about 25 to 40 weight percent of a composition of this invention, and, correspondingly, from about 60 to 75 weight percent of particulate inert diluent. A molding composition typically contains in addition from about 1 to 2 weight percent of a lubricant and from about 1 to 2 weight percent of a colorant, though relatively higher percentages of these last indicated components can be present herein.

USES

As indicated above, the solid compositions of this invention can be used as molding powders. In general, conventional molding powder technology can be employed in the utilization of such solid compositions. Sometimes it is desirable in order to avoid blistering to cool a given mold as those skilled in the art will appreciate. The solid resins can also be used to bond aluminum oxide grits commercially utilized in abrasives.

The liquid compositions of this invention find use for impregnation and reinforcing purposes. Thus, the liquid compositions can be used to impregnate cellulosic paper, asbestos paper and other known woven sheet structures as well as woven fabrics (such as glass fibers, cotton fibers, nylon fibers, etc.) and the like. Impregnation can be accomplished by any conventional or convenient means including dipping, coating, spraying, or the like. The so-impregnated material is conventionally air-dried to lower the volatiles content and then is heated to advance the composition of this invention to a particular desired degree for the ultimate intended use. The so-impregnated sheet materials are themselves particularly useful in the manufacture of laminates. Such laminates, such as those made from impregnated sheet materials as indicated above are useful in electrical applications as supports or as insulation for conductive elements. The laminates so made are particularly characterized by superior heat resistance and thermal stability characteristics. The laminates are generally manufactured in a sheet or block form which is then machined to provide desired configuration for a particular end use.

Oil filters, such as for use in automobiles, can be prepared from the impregnated sheet members produced as generally described above. For example, one can impregnate with a liquid composition of this invention cellulosic papers modified with a synthetic fiber such as a polyester or the like and having a thickness of from about 5 to 20 mils. Sufficient liquid composition is used to impregnate such a sheet member so that the product sheet member when cured has a resin content of from about 15 to 25 weight per cent based on the total product weight. After such a paper is impregnated, it is typically heated to partially advance the resin composition, and hen is corrugated or pleated to form a filter element. The filter element is then assembled with an end use filter condenser and the whole assembly is heated to say from about 250° to 350° F. for from about 5 to 20 minutes to cure the resin. When cured, the product has excellent high temperature characteristics.

In addition, a liquid composition of the present invention can be used to make reinforced plastics.

In this invention, all solids in liquids are conveniently measured using ASTM Test Procedure D–115–55.

EMBODIMENTS

The following examples are set forth to illustrate more clearly the principles and practices of this invention to one skilled in the art and they are not intended to be restrictive but merely to be illustrative of the invention herein contained. Unless otherwise stated therein, all parts and percentages are on a weigh basis.

The following examples illustrate preparation of amine-modified phenolic resole resins:

EXAMPLE A

Preparation of Aromatic Amine-Modified Phenolic Resole Resin

1800 Grams (19.2 moles) of phenol and 2400 grams (29.6 moles) of 37 per cent formalin are charged to a 3 gallon stainless steel reaction kettle equipped with a horseshoe agitator, thermometer, condenser and necessary piping. The temperature is adjusted to about 35° C. 36 Grams of triethyl amine (0.36 moles) are added. Next, over about a 5 minute period, 600 grams (6.45 moles) of aniline are added to the reaction mixture. The temperature rises rapidly to about 50° C. but then levels off. The reaction mixture is brought to a 75° C. reflux under vacuum (about 6 psia) and maintained at this temperature for 45 minutes. At the end of the reflux time, the kettle is changed over to dehydration with the vacuum being increased slowly to about 1.0 psia. Distillation is continued until the resin is grindable by test (usually at about 85°–90° C. with 1.0 psia vacuum). When a sample of the resin is grindable (completely brittle at room temperature), the batch is poured into a pan to cool. A fan is used to cool the resin rapidly to room temperature. The resulting aromatic amine-modified phenolic resole lump resin is an essentially clear, amber-colored, low melting solid at room temperature. The yield of solid resin is about 155 per cent on the phenol charge.

EXAMPLE B

Preparation of Aromatic Amine-Modified Phenolic Resole Resin

1600 Grams (17.0 moles) of phenol and 2560 grams (31.6 moles) of 37 per cent formalin are charged to a 3 gallon stainless steel reaction kettle equipped with a horseshoe agitator, thermometer, condenser and necessary piping. The temperature is adjusted to about 35° C. 16 Grams (0.11 moles) of hexamethylene tetramine are added. Next, over about a 5 minute period, 960 grams (10.3 moles) of aniline are added to the reaction mixture. The temperature rises rapidly to about 60° C., but then levels off. The reaction mixture is brought to an atmospheric reflux (about 100° C.) and maintained at this temperature for about 4 hours. At the end of the reflux time, the kettle is changed over to vacuum dehydration and vacuum slowly applied up to 10 psia (about 90° C.). After about 1½ hours, the vacuum is increased so as to lower the temperature to about 80° C. (about 7 psia). As the temperature rises, vacuum is increased step-wise until 1.0 psia is obtained at about 85° C. Distillation is continued until the resin is grindable by test (usually at about 90°–95° C. with 1.0 psia vacuum). When a sample of the resin is grindable (completely brittle at room temperature), the batch is poured into a pan to cool. A fan is used to cool the resin rapidly to room temperature. The resulting aromatic amine-modified phenolic resole lump resin is an essentially clear, amber-colored, low melting solid at room temperature. The yield of solid resin is about 185 per cent on the phenol charge.

EXAMPLES C-H

Following the same general procedures described in Examples A and B, a series of amine-modified phenolic resins are prepared from phenol, aniline and formaldehyde. Table I below describes each resin:

TABLE I

| | C | D | E | F | G | H |
|---|---|---|---|---|---|---|
| Molar ratio of aniline to phenol | 1/6 | 1/9 | 1/1 | 4/3 | 2/1 | 4/1 |
| Molar ratio of formaldehyde to aniline plus phenol | 1.3/1 | 1.5/1 | 1.2/1 | 1.2/1 | 1.1/1 | 1.1/1 |
| Catalyst | ammonia | calcium hydroxide | barium hydroxide octahydrate | triethyl amine | calcium hydroxide | barium hydroxide octahydrate |

EXAMPLES J-S

Following the same general procedure describes in Examples A and B, a series of amine-modified phenolic resins are prepared using various substituted phenols and aromatic amines. Table II below describes each resin:

TABLE II

| | J | K | L | M | N | O | P | Q | R | S |
|---|---|---|---|---|---|---|---|---|---|---|
| Molar ratio of aromatic amine to phenol | 3.39/1 | 2.74/1 | 2.42/1 | 1.11/1 | 2.06/1 | 1.52/1 | 2.32/1 | 1.96/1 | 1.32/1 | 3.68/1 |
| Identification of phenol | p-Nonyl phenol | p-Phenyl phenol | t-Butyl phenol | Phenol | p-Chlorophenol | p-Chlorophenol | α-Naphthol | 3,5-xylenol | Phenol | bis-Phenol A |
| Identification of aromatic amine | Aniline | Aniline | Aniline | o-Chloroaniline | Aniline | o-Chloroaniline | Aniline | Aniline | o-Toluidine | Aniline |
| Molar ratio of formaldehyde to aromatic amine plus phenol | 1.35/1 | 1.35/1 | 1.35/1 | 1.35/1 | 1.35/1 | 1.35/1 | 1.35/1 | 1.35/1 | 1.35/1 | 1.35/1 |
| Catalyst | Triethyl amine | Ammonia | Barium hydroxide octahydrate | Triethyl amine | Triethyl amine | Triethyl amine | Barium hydroxide octahydrate | Calcium hydroxide | Barium hydroxide octahydrate | Calcium hydroxide |

EXAMPLE T

Preparation of ½ Dibutyl Ester of Benzophenone Tetracarboxylic Acid Dianhydride Solution A mixture of 1,500 grams (20.3 moles) of n-butyl alcohol and 1,250 grams (3.88 moles) of benzophenone tetracarboxylic acid dianhydride (BTDA) is heated over a period of about 1 hour to about 125° C. in a 5-liter, 3-neck Pyrex reaction flask that is equipped with stirrer, thermometer and reflux condenser. At about 123° C., the foregoing mixture becomes clear. It is then allowed to cool slowly to room temperature at which temperature it remained a clear, amber-colored liquid of medium viscosity. Yield: About 2,750 grams.

EXAMPLE U

Preparation of ½ Butyl Ester of Mellitic Dianhydride (Benzene Hexacarboxylic Acid Dianhydride)

A mixture of 956 grams (12.9 moles) of n-butyl alcohol and 612 grams (2.0 moles) of mellitic dianhydride is heated over a period of about 1 hour to about 115° C. in a 5-liter, 3-neck Pyrex reaction flask that it equipped with stirrer, thermometer, nd reflux condenser. At about 113° C., the foregoing mixture becomes clear. Upon allowing it to cool slowly, it starts to become opaque at about 80° C. and is a white colored, almost solid material at room temperature. Yield: About 1,568 grams.

EXAMPLE V

Preparation of Mixed ½ Dipropyl Ester of Benzophenone Tetracarboxylic Acid Dianhydride and Pyromellitic Dianhydride Solution A mixture of 2,000 grams (33.3 moles) of n-propyl alcohol, 1,000 grams (3.11 moles) of benzophenone tetracarboxylic acid dianhydride (BTDA) and 1,000 grams (4.6 moles) of pyromellitic dianhydride is heated over a period of about one hour to about 105° C. in a 5-liter. 3-neck Pyrex reaction flask that is equipped with stirrer, thermometer and reflux condenser. At about 102° C., the foregoing mixture becomes clear. Upon allowing it to cool slowly, it starts to become cloudy at about 75° C., and is a white colored liquid dispersion of medium viscosity at room temperature. Yield: About 4,000 grams.

EXAMPLE W

Preparation of Solid ½ Butyl Ester of Benzophenone Tetracarboxylic Acid Dianhydride A mixture of 505 grams (6.82 moles) of n-butyl alcohol and 1,095 grams (3.40 moles) of benzophenone tetracarboxylic acid dianhydride (BTDA) is heated over a period of about 1 hour at about 150° C. in a 3-liter, 3-neck reflux reaction flask that is equipped with stirrer, thermometer and reflux condenser. At about 145° C., the foregoing mixture becomes clear. It is then allowed to cool slowly to about 130° C. Vacuum is applied up to about 28 Hg. and the resinous mixture distilled until the temperature reached about 160° C. The resulting condensation product is a clear, brittle, glass-like solid at room temperature which shows a tendency to become sticky in the presence of moisture. Yield: About 1,425 grams.

EXAMPLE X

Preparation of Tetrahexyl Ester of Pyromellitic Dianhydride

A mixture of 2,448 grams (24 moles) of n-hexyl alcohol, 655 grams (3 moles) of pyromellitic dianhydride (PMDA) and 15 grams (0.08 moles of p-toluene sulfonic acid is refluxed at about 160° C. for 8 hours in a 5-liter, 3-neck Pyrex reaction flask that is equipped with stirrer, thermometer and reflux condenser. The water formed is removed by distillation. The product is a liquid of low viscosity.

Examples of compositions of this invention follow:

EXAMPLE 1

Preparation of Thermosetting Varnish from Aromatic Amine Modified Phenolic Resole Resin and an Aromatic Polycarboxylic Compound A 50 weight per cent resin solution is made by dissolving 1,000 grams of the solid resin from Example A on 1,000 grams of Cellosolve. Alternatively, this solution is made by adding the solvent to the molten resin at the end of the resin distillation cycle. The resulting solution is a clear, amber-colored liquid of medium viscosity. To this solution is added 860 grams of ½ dibutyl ester of benzophenone tetracarboxylic acid dianhydride solution from Example T. With sufficient mechanical blending, the mixture gives a clear, amber-color varnish. When a small amount (1-2 grams) is placed on a hot plate at about 180° C., this varnish cures to a hard thermoset resin following evaporation of the solvent. Cellosolve is ethylene glycol monoethyl ether.

EXAMPLES 2-7

Preparation of Varnish

Following the same procedure described in Example 1, a series of varnishes are prepared from amine-modified phenolic resins and aromatic polycarboxylic compounds. Table III below describes each resin:

TABLE III

|  | 2 | 3 | 4 | 5 | 6 | 7 |
|---|---|---|---|---|---|---|
| Resin Identification (Ex. No.) | B | A | C | E | G | M |
| Part A Solvent | Methyl ethyl ketone | DMF | Ethyl butyl ketone | Methyl ethyl ketone | Methyl ethyl ketone | Cellosolve |
| Resin Concentration |  |  |  |  |  |  |
| Part B Aromatic Polycarboxylic Compound | T | BTDA* | V | X | T | U |
| Ratio by wt. of A to B in final varnish | 1/1.3 | 1/0.4 | 1/0.2 | 1/2.4 | 1/2.3 | 1/1.5 |

*Benzophenone Tetracarboxylic Acid Dianhydride

EXAMPLE 8

Preparation of Thermosetting Resin Powder from Aromatic Amine-Modified Phenolic Resole Resin and an Aromatic Polycarboxylic Compound 500 Grams of resin from Example A, 260 grams of aromatic polycarboxylic compound from Example J and 10 gram of calcium stearate are ground together in a laboratory ball mill until essentially all of the material passed U.S. sieve no. 140. The product is a tan colored resin powder. When a small amount (1-2 grams) is placed on a hot plate at about 180° C. this resin melts and then cures to a hard thermoset resin.

EXAMPLES 9-10

Following the same general procedure described in Example 7, a series of resin powders are prepared from amine-modified phenolic resins and aromatic polycarboxylic compounds. Table III below describes each resin:

TABLE III

|  | 9 | 10 | 11 |
|---|---|---|---|
| Part A Resin Identification (Ex. No.) | C | E | M |
| Part B Aromatic Polycarboxylic Compound Identification (Ex. No.) | J | J | J |
| Ratio by wt. of A to B in final product | 1/0.25 | 1/1 | 1/0.75 |

PART A

Sheets of glass cloth E.C.D. 225-181 finished with gamma-aminopropyltriethoxysilane are impregnated by dipping the cloth in the resin solution prepared in Example 1, and removing the excess resin solution by drawing the cloth over a scraper bar. The impregnated cloth is heated in an oven for about one-quarter hour at about 135° C. to remove the solvent from the impregnated cloth and to partially advance the resin. The resulting cloth contains about 40 per cent resin solids and about 6 per cent of volatiles.

PART B

A series of laminates one-eight inch thick are prepared from 12 sheets of resin impregnated cloth prepared as described in Part A. The 12 plies of cloth are laid up with the warp running in the same direction in all plies and the assembly is pressed under a pressure of approximately 300 p.s.i. at a temperature of 350° F. for 90 minutes. After being removed from the mold, the laminate is post-cured by being heated in an air-circulating oven in accordance with the following schedule:
24 hours at 310° F.
24 hours at 350° F.
24 hours at 400° F. pl 4 hours at 450° F.
48 hours at 500° F.

These laminates have flexural strengths in the range of from about 70,000 to 90,000 p.s.i. at 75° F. The above and all subsequently reported flexural strength values are measured by Federal Specification L—P—406 Test Method No. 1031.

PART C

The laminates prepared in Part B above are maintained in an air-circulating oven for 100 hours at 600° F. The flexural strengths of the laminates are then determined at 600° F. with values of from about 30,000 to 50,000 p.s.i. being obtained.

What is claimed is:

1. A thermosettable resin composition comprising in combination on a 100 weight per cent total basis:

A an aromatic polycarboxylic compound of the formula:

$$R_3\left[\begin{array}{c}O\\\parallel\\C\\ \diagup \diagdown \\ \diagdown \diagup \\C\\\parallel\\O\end{array}O\right]_n(-COOH)_m(-COOR_4)_p$$

in which $R_3$ is an aromatic radical of three, four, five, or six valences and containing from six to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of $n$ and $p$ is always at least 1, B. an aromatic amine-modified resole resin condensate of an aldehyde, an aromatic amine and a phenol havinG at least one reactive unsubstituted position on the aromatic nucleus, the resin being characterized by having:
   1. a combined aldehyde to aromatic amine plus phenol ratio of from about 1.0 to 2.5;
   2. a mol ratio of aromatic amine to phenol in the range of 75:25 to 10:90;

wherein the amounts of reactants are such that for each 100 parts by weight of said aromatic amine-modified resole resin condensate there are from 5 to 200 parts by weight of said aromatic polycarboxylic compound.

2. A composition of claim 1 wherein the phenol is selected from the group consisting of phenol, t-butylphenol, p-phenylphenol, p-nonylphenol, p-chlorophenol, alpha-naphthol, 3,5-xylenol and bis-phenol A.

3. A composition of claim 1 wherein the aromatic amine is selected from the group consisting of aniline, o-toluidine and o-chloroaniline.

4. A composition of claim 1, wherein the aldehyde is formaldehyde.

5. A thermoset composition of claim 1.

6. A composition of claim 1 wherein said compounds are suspended in an organic solvent medium.

7. A composition of claim 1 wherein said aromatic polycarboxylic compound is an ester of trimellitic anhydride.

8. A composition of claim 1 wherein said aromatic polycarboxylic compound is an ester of benzophenone tetracarboxylic anhydride.

9. A composition of claim 1 wherein said aromatic polycarboxylic compound is an ester of pyromellitic anhydride.

10. A thermosettable resin composition comprising:
   A. an aromatic polycarboxylic compound selected from the group consisting of mellitic anhydride, pyromellitic dianhydride, and benzophenone tetracarboxylic acid dianhydride, mellitic acid dialkyl ester, pyromellitic acid dialkyl ester, pyromellitic acid tetraalkyl ester, benzophenone tetracarboxylic acid dialkyl ester and benzophenone tetracarboxylic acid tetraalkyl ester, wherein the alkyl groups contain one to six carbon atoms;
   B. an aniline-modified phenol formaldehyde condensate prepared under basic conditions, characterized by having:
      1. a number average molecular weight of from about 150 to 800;
      2. a combined formaldehyde to aniline plus phenol mol ratio of from 1.0 to 2.0;
      3. a mol ratio of aniline to phenol in the range of 50:50 to 20:80;
   there being for each 100 parts by weight of said aniline-modified resole from 5 to 200 parts by weight of said aromatic polycarboxylic compound.

11. A thermosettable resin composition of claim 10, wherein there are between 15 and 90 parts by weight of aromatic polycarboxylic compound for each 100 parts by weight of aniline-modified resole.

* * * * *